United States Patent Office 3,318,834
Patented May 9, 1967

3,318,834
COLLOIDALLY STABLE SOLVENT CEMENT COMPOSITIONS COMPRISING CHLOROPRENE POLYMERS, PHENDIC RESINS, AND POLYISOCYANATES
Richard M. Tabibian, Wilmington, Del., assignor to E. I. du Pont de Nemours and Company, Wilmington, Del., a corporation of Delaware
No Drawing. Filed Jan. 30, 1964, Ser. No. 341,416
9 Claims. (Cl. 260—31.2)

This invention relates to adhesive cements and more particularly to chloroprene polymer cements containing polyisocyanates.

The preparation of solvent cements containing chloroprene polymers is well known in the art. The preparation of such cements is described, for example, in "Neoprene Solvent Cements," Report No. 55–4, Elastomers Division, E. I. du Pont de Nemours and Co., August 1955. The incorporation into the cement of oil-soluble, heat-reactive phenolic resins improves certain adhesive properties of the cements. More recently it has been found that it is advantageous to react the resin with magnesium oxide before it is blended with the chloroprene polymer. Such an improvement is disclosed in U.S. Patent 3,044,-976. However, the addition of these phenolic resins to the cement composition introduces a new problem, namely, a tendency of the dispersed metal oxides in the cement to be colloidally unstable. These metal oxides tend to flocculate and settle to the bottom of the container as a sediment. This does not permanently damage the adhesive properties of the cement, since the stratified cements can be restored to their original condition by agitation. However, mixing the cement before it is used is a troublesome and time consuming operation, particularly if large containers of adhesive are involved. Also, the inadvertent use of a stratified cement can lead to unsatisfactory and inconsistent results, since the composition of the adhesive in a given container will not be uniform.

It is an object of this invention to provide a novel chloroprene polymer adhesive cement composition. A further object is to provide a non-settling chloroprene polymer adhesive composition containing a chloroprene polymer, the reaction product of a phenolic resin with magnesium oxide, and a polyisocyanate. A still further object is to provide a method for the preparation of an improved adhesive cement composition. Other objects will appear hereinafter.

These and other objects of this invention are accomplished by utilizing a particular type of organic polyisocyanate in the preparation of known chloroprene polymer adhesive cement compositions. More particularly, the cement composition comprises a volatile organic solvent, a chloroprene polymer, zinc oxide, magnesia, an organic polyisocyanate and the reaction product of magnesia with an oil-soluble, heat-reactive phenolic resin. The chloroprene polymer, zinc oxide and magnesia are incorporated into a portion of the solvent to form component (a). A solution, component (b), which is the reaction product of the phenolic resin and magnesia in another portion of solvent, is then added to component (a). In accordance with the present invention, a non-settling cement composition is obtained by the addition to component (a), prior to the addition thereto of component (b), of at least 0.05% by weight, based on the total weight of the solvent cement composition, of an organic isocyanate containing at least 3 isocyanato groups per molecule, which isocyanate is a polyaryl polyisocyanate in which each isocyanato radical is a substituent on a different aryl nucleus.

The chloroprene polymers which may be used in preparing the solvent cements of this invention are homopolymers of chloroprene or copolymers of chloroprene with one or more copolymerizable olefinically unsaturated monomers, such as styrene, acrylonitrile, or 2,3-dichloro-1,3-butadiene. Any comonomer used should be inert to isocyanates, that is, it should not bear a functional group which contains reactive hydrogen, as determined by the Zerewitinoff test. The preparation of the chloroprene polymers is well known in the art. While some types of chloroprene polymers are readily soluble in the solvents used in the preparation of solvent cements, other types may require a limited amount of milling to convert them to a soluble form.

The solvent to be used in preparing the cements of this invention is usually a blend of two or more volatile organic materials. The essential requirements for the solvent are that it should dissolve the chloroprene polymer and that it should be inert to isocyanate groups; that is, it should be essentially free of functional groups containing active hydrogen, as determined by the Zerewitinoff test. Blends are usually preferred since they permit greater control of such properties of adhesives as viscosity and drying characteristics. Aromatic hydrocarbons, such as toluene and xylene, aliphatic hydrocarbons, ketones, esters and chlorinated hydrocarbons are useful classes of solvents for preparing solvent blends for chloroprene polymer adhesives. The following blends are representative of the solvents which can be used in preparing the adhesives of this invention. The composition of the blends is indicated in parts by volume.

| | |
|---|---|
| Methyl ethyl ketone | 3 |
| Hexane | 2 |
| Toluene | 1 |
| Hexane | 1 |
| Ethyl acetate | 1 |
| Toluene | 3 |
| Hexane | 3 |
| Ethyl acetate | 3 |
| Trichloroethylene | 1 |
| Acetone | 3 |
| Heptane | 7 |
| Toluene | 1 |
| Ethyl acetate | 4 |
| Toluene | 1 |
| Methyl ethyl ketone | 1 |
| Hexane | 1 |

The phenolic resins which may be used in practicing this invention are the oil-soluble heat-reactive types which are prepared by reacting formaldehyde, preferably one to two moles thereof, with one mole of a substituted phenol in the presence of an alkaline catalyst. The substituent on the phenol is preferably in the para position and may be an aryl radical such as a phenyl or tolyl radical, or it may be an alkyl radical containing three to six carbon atoms. Resins prepared from phenols substituted with branched alkyl radicals, such as p-tertiary-butylphenol, p-isopropylphenol, and p-tertiary-amylphenol, are especially useful. Resins prepared from p-tertiary-butylphenol are preferred. Resins of this type are well known and are available commercially.

In practicing the process of this invention, the phenolic resin is reacted with magnesia before it is added to the solution of chloroprene polymer which is designated above as component (a). The reaction is carried out by dissolving the phenolic resin in a suitable solvent, adding the magnesia, and stirring the mixture until the reaction has taken place. This solution of the reaction product is designated as component (b). The reaction may be accelerated by the addition of traces of water. However, since water will react with the isocyanate to be added to the cement, only the least possible amount of water should be used. The examples illustrate the fact that small amounts of water may be added without adverse effect. The reaction of magnesia with the resin does not take place readily in polar solvents at room temperature. If the solvent to be used in preparing the cements is one in which the resin and magnesia do not readily react, the reaction may be carried out in a non-polar solvent, the solvent may be evaporated off, and the resin-magnesia reaction product may then be re-dissolved in the desired solvent for addition to the chloroprene polymer solution. Any unreacted magnesia may be filtered off or added to the solvent cement as part of the over-all magnesia content of the cement. If a solvent such as ethyl acetate is used, it should contain no significant amounts of free ethanol or acetic acid.

Stabilization of cements is sometimes achieved when the phenolic resin and magnesia have not been reacted before addition to the solution containing the chloroprene polymer and the isocyanate, particularly when the solvent is one in which the resin-magnesia reaction proceeds rapidly. However, stabilization is more consistently effected when the magnesia and resin have been prereacted.

The reaction product of the phenolic resin and magnesia and methods of preparing it are described in U.S. Patent 3,044,976. The amount of phenolic resin to be reacted with magnesia and incorporated into the cement will depend on the particular properties desired in the cement. In general, the range of 10 to 100 parts by weight of the resin per 100 parts of chloroprene polymer represents the most desirable range. Cohesive strength at elevated temperature of the adhesive films produced by the cement is almost directly proportional to the amount of heat reactive resin in amounts up to 40 to 45 parts of resin per 100 parts of chloroprene polymer. More than 40 to 45 parts makes the film brittle, but other properties such as adhesion to metal are improved by higher amounts of resin.

The amount of magnesia to be used is the amount sufficient to convert the phenolic resin to the reaction product, as described in U.S. Patent 3,044,976, plus the additional amount of magnesia to be added directly to the polychloroprene. This reaction product should have a melting point and preferably, a decomposition point, of at least 25° F. above the melting point of the phenolic resin. The optimum amount of the magnesia for reaction with the resin is about 6 to about 10 percent of the weight of the resin; thus, with amounts of resin ranging from 10 to 100 parts, about 0.6 to about 10 parts by weight of magnesia should be used in preparing the resin-magnesia reaction product. An additional amount, ranging from about 1 to about 10 parts, by weight, per 100 parts of chloroprene polymer, is incorporated into the chloroprene polymer. Magnesia acts as an acid acceptor and improves the processing safety of the chloroprene polymer stocks containing zinc oxide. Four parts of magnesia per 100 parts of polymer is the amount usually recommended in compounding chloroprene polymers.

The zinc oxide which is added to the chloroprene polymer component serves as an acid acceptor and also slowly vulcanizes deposited films of polychloroprene adhesives at room temperature without interfering with the stability of the adhesive solution. Zinc oxide may be used in amounts ranging from 2 to 10 parts by weight per 100 parts of chloroprene polymer. A least 2 parts of zinc oxide is required to produce films having satisfactory properties. More than 10 parts of zinc oxide may reduce the stability of the adhesive solution by causing slow vulcanization even at room temperature. Five parts of zinc oxide is the amount most often recommended.

In preparing the solvent cements from chloroprene polymers in accordance with this invention, the polymer, the desired amounts of zinc oxide and magnesia, and any other desired compounding ingredients such as antioxidants, accelerators, reinforcing agents, fillers and extenders conventionally used in compounding chloroprene polymers, are thoroughly blended with an amount of solvent to form component (a) which is a solution of the chloroprene polymer having dispersed therein the metal oxides and other insoluble materials. The isocyanate is added to this mixture at any convenient time prior to the addition of the phenolic resin-magnesia reaction product, i.e. component (b). For example, the isocyanate may be blended with the chloroprene polymer, or added to the solvent before or after the polymer and solvent are mixed. The phenolic resin and magnesia are preferably reacted separately as previously described and added as a solvent solution to the solvent containing the chloroprene polymer and the compounding ingredients. If desired, additional solvent may be added.

The polyisocyanates to be added to component (a) may be any polyaryl polyisocyanate containing at least three isocyanato radicals per molecule, each of which isocyanato radicals is substituted on a different aryl nucleus.

One suitable type of isocyanate may be represented by the general formula

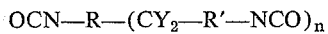

in which R and R' are arylene radicals, Y is hydrogen, an alkyl radical, or an aryl radical, and n is a whole number which is at least 2, and the (CY₂—R'—NCO) groups in excess of one are attached to an R' radical. These isocyanates are prepared by reacting an aryl mono primary amine with an aliphatic or aromatic aldehyde or ketone to yield a mixture of secondary polyamines. These secondary amines are subjected to rearrangement to primary polyamines by means of a mineral acid such as hydrochloric acid. The primary polyamines are then phosgenated to the polyisocyanates. Examples of suitable polyisocyanates are those produced by the phosgenation of polyamines resulting from the reaction of aniline with formaldehyde, benzaldehyde, acetaldehyde, methyl ethyl ketone or acetone; o-toluidine with formaldehyde, benzaldehyde, acetaldehyde, methyl ethyl ketone or acetone; o-chloroaniline with formaldehyde, benzaldehyde, acetaldehyde, methyl ethyl ketone or acetone; and o-anisidine with formaldehyde, benzaldehyde, acetaldehyde, methyl ethyl ketone or acetone. The preparation of these isocyanates is described in U.S. Patent 2,683,730. The products may be mixtures of polyisocyanates. To be suitable for use in the process of this invention the mixture should contain a predominating amount of polyisocyanates in which the number of isocyanato radicals per molecule is three or higher.

Other suitable polyisocyanates are tris(isocyanatophenyl)alkanes, such as tris(4-isocyanatophenyl)methane, and tris(isocyanatophenyl) phosphates or thiophosphates.

In practicing the process of this invention, at least 0.05 percent by weight of the isocyanate, based on the total weight of the cement composition, should be used to produce the desired effect, although in some cases as little as 0.01 percent may suffice. In general, more than 1 percent of the polyisocyanate is not required. In some cases more than 1 percent of the isocyanate may cause agglomeration of the solids content in the cement, although in other cases as much as 3 percent may be used satisfactorily.

In order to obtain the desired stabilization against stratification of the cement composition, it is essential that the polyisocyanate be incorporated into the composition containing the chloroprene polymer before the addition thereto of the solution containing the reaction product of the phenolic resin and magnesia.

The amount of solvent in the final cement composition will depend on such factors as the particular use to be made of the cement, the viscosity desired, the solvent used, and the solubility of the particular chloroprene polymer or resin used. In general, the solids content of the cement will vary between 15 and 45 percent by weight. The preferred solids content in the solvent cement is 20 to 30 percent by weight.

It has been found that when the solvent cements are prepared by the process of this invention, they show significant increase in stability against flocculation and sedimentation of the suspended solids.

The following examples will better illustrate the nature of the present invention; however, the invention is not intended to be limited to these examples. Parts are by weight unless otherwise indicated.

*Example 1*

A. An emulsion is prepared using the following recipe:

| | Parts by weight |
|---|---|
| Chloroprene | 100 |
| Dodecyl mercaptan | 0.25 |
| Disproportionated rosin | 4 |
| Water | 140 |
| Sodium hydroxide | 0.66 |
| Sodium salt of formaldehyde-naphthalene sulfonic acid condensate | 0.5 |
| Sodium sulfite | 0.55 |

Polymerization is carried out in a nitrogen atmosphere at 10° C. The catalyst solution, which is added at such a rate as to give the desired rate of polymerization, is, by weight, 2.80 parts of water and 0.035 part of potassium ferricyanide. Polymerization is carried out to 85–95 percent monomer conversion. Polymerization is then stopped by adding about 2 parts of an emulsion containing phenothiazine and 4-tert-butylcatechol prepared essentially as described in Example 1 of U.S. Patent 2,576,009 except that toluene is used as the hydrocarbon solvent. The latex is additionally stabilized by the addition of an emulsion of the following composition:

| | Parts by weight |
|---|---|
| Water | 1.59 |
| Sodium lauryl sulfate | 0.21 |
| Sodium salt of formaldehyde-naphthalene-sulfonic acid condensate | 0.04 |
| Tetraethylthiuram disulfide | 1.50 |
| Toluene | 2.11 |

Any unreacted chloroprene is removed by steam stripping as described in U.S. Patent 2,467,769. The chloroprene polymer is then acidified with acetic acid and removed by freeze coagulation in the form of a thin film as described in U.S. Patent 2,187,146.

B. The polyisocyanate used corresponds to the formula

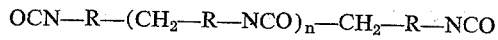

OCN—R—(CH$_2$—R—NCO)$_n$—CH$_2$—R—NCO where R is phenylene and $n$ is an integer. The amine equivalent is approximately 136. The number-average molecular weight, determined cryoscopically in benzene, is about 400. This product is made by phosgenation of a polyamine prepared by condensation of formaldehyde with aniline in the presence of hydrochloric acid. The procedure is described in U.S. Patent 2,683,730. The amine equivalent is defined as the number of grams of isocyanate which is consumed by one gram mol of a secondary amine, such as di-n-butylamine, in the formation of the corresponding urea. The procedure involved in making this determination is described in an article by Siggia and Hanna, Ind. and Eng. Chem., Analytical Edition, 20, 1084 (1948).

C. The phenol-formaldehyde resin used is prepared by reacting one mole of p-tert-butylphenol with 1–2 moles of formaldehyde under alkaline conditions.

D. Individual samples of cement for testing are prepared by compounding 50 grams of the chloroprene polymer prepared in A above on a rubber mill with 2 grams of magnesia and 2.5 grams of zinc oxide. The resulting composition is dissolved in a solvent blend consisting of 80 grams of hexane and 80 grams of ethyl acetate (assaying as 99 percent ethyl acetate). Five samples for testing are prepared. To each of four of the solvent blends, a different amount of isocyanate prepared in B above is added in the following respective amounts: 0.16 gram, 0.32 gram, 1.6 grams and 3.2 grams (to give the following weight percentages, respectively, in the final cement: 0.05, 0.1, 0.5 and 1). The fifth solvent blend contains no isocyanate and serves as the control.

While the polymer is being dissolved, a solution of the reaction product of the magnesia and the resin prepared in C above is prepared. The following recipe is used:

| | Grams |
|---|---|
| Resin | 112.5 |
| Toluene | 400 |
| Magnesia | 10 |
| Water (to accelerate the reaction with the resin) | 0.3 |

After stirring for two hours, the resin solution is divided into five equal portions and a portion is added to each of the five samples of polychloroprene solutions. The resulting compositions are thoroughly mixed. The cements thus formed have a smooth creamy appearance. Each sample is divided into two portions; each portion is put into a bottle which is then stoppered. One set of bottles is stored at room temperature and the other set is placed in an oven maintained at 50° C. The samples are examined visually to determine whether the metal oxides have settled. In evaluating the samples, the following terminology is used.

*Stable.*—The sample is said to be stable when it is essentially unchanged in appearance. A slight film of clear material at the top or a trace of solids at the bottom is disregarded if the cement remains otherwise homogeneous throughout.

*Unstable.*—The sample is said to be unstable when the smooth uniform dispersion begins to show a particulate structure. The flocculated particles may vary considerably in size. Flocculation is usually followed by sedimentation of the solids to form a clearly distinguishable layer of solids at the bottom of the container.

In this experiment, all the samples containing the isocyanate are stable at the end of four months. On the other hand, each sample not containing the isocyanate is unstable at the end of two days.

The amounts of the various materials used in each sample in this example, per 100 parts by weight of chloroprene polymer, are:

| | Parts by weight |
|---|---|
| Magnesia: | |
| In the polymer solution | 4 |
| Reacted with the resin | 4 |
| Zinc oxide | 5 |
| Resin | 45 |
| Solvent: | |
| Hexane | 160 |
| Ethyl acetate | 160 |
| Toluene | 160 |

Similar results are obtained when the isocyanate is added to the chloroprene polymer on the mill instead of being added to the solvent.

When this experiment is repeated except that the isocyanate added is methylenedi-p-phenylene diisocyanate, all samples are unstable within three days. This illustrates the fact that unsatisfactory results are obtained when the isocyanate contains only two isocyanate groups in the molecule.

*Example 2*

This example is carried out in the same way as Example 1 except that the isocyanate used is tris(4-isocyanatophenyl)methane, which is added to the solution of chloroprene polymer as a 20% solution in methylene chloride. Seven samples are prepared containing, respectively, the following percentages, by weight, of the triisocyanate: 0, 0.01, 0.05, 0.1, 0.5, 1.0, and 2.0. When kept at 25° C., all of the cements containing the isocyanate are stable for at least three months, whereas the cements containing no isocyanates are unstable after one day. Of the samples kept at 50° C., the sample containing 0.01 percent isocyanate is stable for two months. The sample containing 0.05 percent is stable for nearly three months and all other samples containing higher percentages of isocyanate are stable at the end of three months. The samples containing no isocyanate are unstable after one day.

*Example 3*

This example is identical with Example 2 except that the isocyanate used is 0,0,0-tris(4-isocyanatophenyl)thiophosphate. The control samples containing no isocyanate are unstable within three days. Of the samples kept at 25° C., all samples are stable at the end of three months except the sample containing 0.01 percent of isocyanate, which is unstable by the tenth day. Of the samples kept at 50° C., the sample containing 0.01 percent isocyanate is unstable within three days, the sample containing 0.05 percent isocyanate is stable at the end of two months but is unstable at the end of three months; and all other samples containing higher amounts of isocyanate are stable at the end of three months.

*Example 4*

This example is carried out in the same way as Example 1 except that the solvent used throughout is a mixture prepared by blending 3 parts by volume of methyl ethyl ketone with 2 parts by volume of hexane. However, in preparing the resin-magnesia reaction product, the reaction is carried out in toluene as described in Example 1. Excess magnesia (about 2.5 grams in excess per 112.5 grams of resin) is removed by filtration and the toluene is evaporated off. The residue is then dissolved in the methyl ethyl ketone-hexane solvent blend (80 grams of solvent per 22.5 grams of resin before reaction) and this blend is added to the polychloroprene solution as in Example 1. The samples of cement containing 0.01 percent isocyanate and the samples containing no isocyanate are unstable within three days. All other samples are stable after four months.

As many widely different embodiments of this invention may be made without departing from the spirit and scope thereof, it is to be understood that this invention is not limited to the specific embodiments thereof except as defined in the appended claims.

What is claimed is:

1. A process for preparing a non-settling solvent cement composition comprising a volatile organic solvent, said solvent being inert with respect to the isocyanate, a chloroprene polymer, zinc oxide, magnesia, an organic polyisocyanate and the reaction product of magnesia with an oil-soluble heat-reactive phenolic resin, said resin having been prepared by reacting formaldehyde with a substituted phenol under alkaline conditions, in which process said chloroprene polymer, zinc oxide and magnesia are incorporated into a portion of said solvent so as to form component (a), and component (b), which is a solution in another portion of said solvent of the reaction product of magnesia and said phenolic resin, is added to component (a), the improvement comprising adding to component (a), before the addition thereto of component (b), at least 0.05 percent by weight, based on the total weight of the solvent cement composition, of an organic isocyanate containing at least 3 isocyanato groups per molecule, which isocyanate is a polyaryl polyisocyanate in which each isocyanato radical is a substituent on a different aryl nucleus.

2. A process for preparing a non-settling solvent cement composition comprising forming component (a) by incorporating into a volatile organic solvent, said solvent being inert with respect to the isocyanate, a chloroprene polymer, zinc oxide, magnesia and a organic isocyanate, adding thereto as component (b) a solution in a volatile organic solvent, said solvent also being inert with respect to the isocyanate, of the reaction product of magnesia and an oil-soluble heat-reactive phenolic resin, said resin being prepared by reacting formaldehyde with a substituted phenol under alkaline conditions; with the proviso that said organic isocyanate be present in an amount of from about 0.05 to about 1.0 percent by weight, based on the total weight of the solvent cement composition, and that said organic isocyanate contain at least 3 isocyanato groups per molecule, said isocyanate being a polyaryl polyisocyanate in which each isocyanato is a substituent on a different aryl nucleus.

3. The non-settling solvent cement composition prepared by the process of claim 2.

4. The process of claim 2 wherein the amount of zinc oxide ranges from about 2 to 10 parts by weight per 100 parts by weight of chloroprene polymer, the amount of magnesia ranges from about 1 to 10 parts by weight per 100 parts by weight of chloroprene polymer and the reaction product of magnesia with the oil-soluble heat-reactive phenolic resin is prepared by reacting from about 0.6 to 10 parts by weight of magnesia with from about 10 to 100 parts by weight of resin.

5. The process of claim 4 wherein the oil-soluble heat reactive phenolic resin is prepared by reacting under alkaline conditions from about 1 to 2 moles of formaldehyde with about 1 mole of a p-substituted phenol, said substituent being selected from the group consisting of an aryl radical and an alkyl radical containing from 3 to 6 carbon atoms.

6. The process of claim 2 wherein the organic isocyanate corresponds to the formula

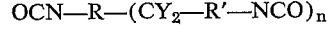

$$OCN-R-(CY_2-R'-NCO)_n$$

wherein R and R' are arylene radicals, Y is selected from the group consisting of hydrogen, alkyl and aryl radicals, n is a whole number, which is at least 2, and the (CY$_2$—R'—NCO) groups in excess of one are attached to an R' radical.

7. The process of claim 2 wherein the organic isocyanate corresponds to the formula

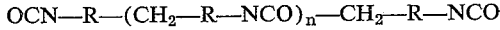

$$OCN-R-(CH_2-R-NCO)_n-CH_2-R-NCO$$

wherein R is phenylene and n is an integer, said isocyanate having an amine equivalent of about 136 and a number average molecular weight of about 400.

8. The process of claim 2 wherein the organic isocyanate is tris(4-isocyanatophenyl)methane.

9. The process of claim 2 wherein the organic isocyanate is 0,0,0-tris(4-isocyanatophenyl) thiophosphate.

No references cited.

MORRIS LIEBMAN, *Primary Examiner.*

R. BARON, *Assistant Examiner.*